(12) United States Patent
Hsu et al.

(10) Patent No.: US 7,389,249 B2
(45) Date of Patent: Jun. 17, 2008

(54) AUTOMATED SUPPLY MANAGEMENT METHOD FOR DYNAMICALLY FULFILLING A CUSTOMER REQUESTED ORDER

(75) Inventors: Chih-Yi Hsu, Hualien (TW); Yi-Chin Hsu, Hsin-Chu (TW); Yi-Cherng Wang, Tainan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1232 days.

(21) Appl. No.: 10/460,590

(22) Filed: Jun. 11, 2003

(65) Prior Publication Data

US 2004/0254825 A1    Dec. 16, 2004

(51) Int. Cl.
G06F 17/30    (2006.01)
G06F 17/60    (2006.01)

(52) U.S. Cl. ............................................. 705/8; 705/28
(58) Field of Classification Search ...................... 705/8
See application file for complete search history.

(56) References Cited

U.S. PATENT DOCUMENTS 5,953,707 A * 9/1999 Huang et al. .................. 705/10
6,920,427 B2 * 7/2005 Anthony et al. ................ 705/8
7,243,074 B1 * 7/2007 Pennisi, Jr. ..................... 705/8

2002/0165804 A1 * 11/2002 Beebe et al. ................... 705/28

OTHER PUBLICATIONS

Silver et al., Inventory Management and Production Planning and Scheduling, John Wiley & Sons, 1998, p. 423-24, 440-43.*
Armistead and Clark, The "coping" capacity management strategy in services and the influence on quantity performance, International Journal of Service Industry Management, vol. 5, No. 2, 1994, p. 5-22.*
Layden, A Rapidly Changing Landscape, Manufacturing Systems, Mar. 1996, p. A10-A18.*

* cited by examiner

Primary Examiner—Romain Jeanty
Assistant Examiner—Justin M Pats
(74) Attorney, Agent, or Firm—Tung & Associates

(57) ABSTRACT

An automated supply management system for dynamically fulfilling a customer requested order having an order fulfillment system for fulfilling a plurality of customer requests in accordance with a plurality of processing capacity restraints defined for a plurality of pieces of manufacturing equipment disposed within a manufacturing facility; an allocation planning system for receiving a plurality of capacity modeling data from the order fulfillment system, an order management system for communicating a plurality of consumption data and a customer requested due date to the order fulfillment system, wherein the order management system requests the customer requested due date and receives a calendar date of production available to promise from the order fulfillment system; and a manufacturing planning system for receiving an order fulfillment matrix from the order fulfillment system.

2 Claims, 7 Drawing Sheets

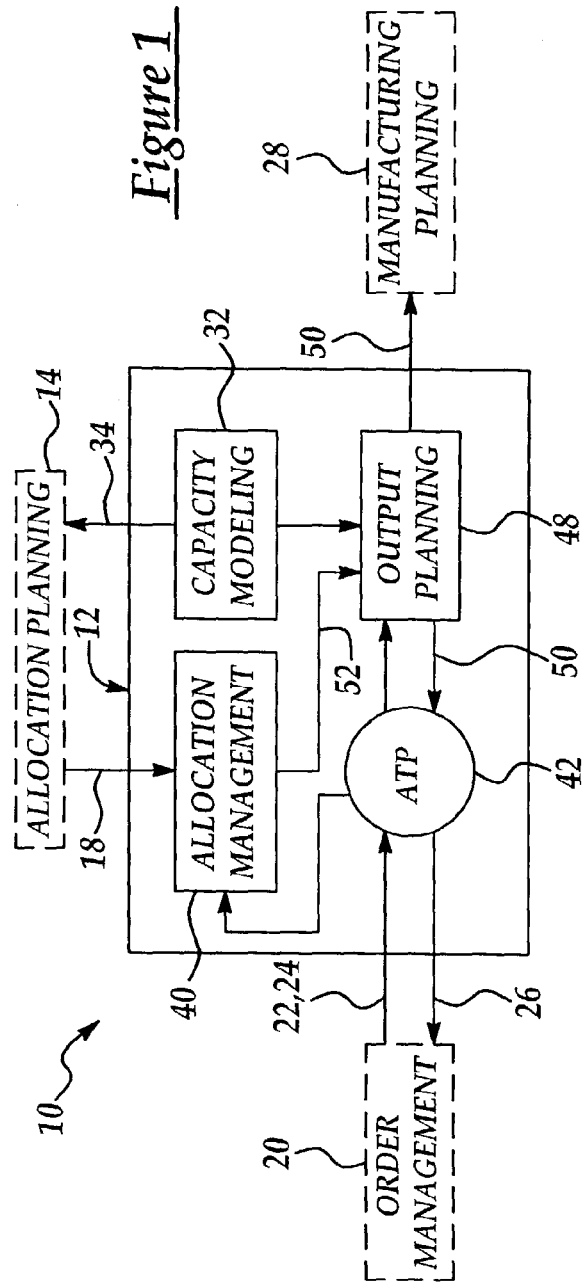

Figure 3

| | 10/5 | 10/15 | 10/20 | 10/25 | 11/2 | 11/7 | 11/21 | 11/27 | 12/8 | 12/16 | 12/22 | 12/28 |
|---|---|---|---|---|---|---|---|---|---|---|---|---|
| PRODUCT A FOR CUSTOMER FAMILY XYE | 0 | WIP | WIP | WIP | 100 | 100 | 100 | 100 | 100 | 100 | 100 | 100 |
| PRODUCT B FOR CUSTOMER FAMILY XYE | 0 | WIP | WIP | WIP | 100 | 100 | 100 | 100 | 100 | 100 | 100 | 100 |
| AVAILABLE CAPACITY OF KNOWN MACHINES FOR PRODUCT A | WIP | WIP | WIP | 100 | 100 | 100 | 100 | 100 | 100 | 100 | 100 | 100 |
| AVAILABLE CAPACITY OF KNOWN MACHINES FOR PRODUCT A | WIP | WIP | WIP | 100 | 100 | 100 | 100 | 100 | 100 | 100 | 100 | 100 |
| REMAINING CAPACITY | 0 | WIP | WIP | 100 | 100 | 100 | 100 | 100 | 100 | 100 | 100 | 100 |

START
↓
80 — DEFINING A QUANTITY M NEEDED TO FULFILL A CUSTOMER ORDER
↓
82 — DEFINING A CUSTOMER REQUESTED DUE DATE
↓
84 — PROVIDING AN ORDER FULFILLMENT MATRIX HAVING A PLURALITY OF ALLOCATED CAPACITY CELLS
↓
86 — SEARCHING EACH OF THE PLURALITY OF ALLOCATED CAPACITY CELLS HAVING AN ALLOCATED CAPACITY QUANTITY T EXCEEDING ZERO IN ACCORDANCE WITH AN ALLOCATION SEARCH SEQUENCE
↓
88 — ET > 0, UNTIL 1 ≤ T ≥ M
↓
90 — RETURNING A CALENDAR DATE OF PRODUCTION ASSOCIATED WITH A LAST SEARCHED ONE OF THE PLURALITY OF ALLOCATED CAPACITY CELLS HAVING AN ALLOCATED CAPACITY QUANTITY T GREATER THAN ZERO TO AN ORDER MANAGEMENT SYSTEM AS AN AVAILABLE TO PROMISE DATE TO FULFILL A CUSTOMER ORDER
↓
END

| | 10/5 | 10/15 | 10/20 | 10/25 | 11/2 | 11/7 | 11/21 | 11/27 | 12/8 | 12/16 | 12/22 | 12/28 |
|---|---|---|---|---|---|---|---|---|---|---|---|---|
| PRODUCT A FOR CUSTOMER FAMILY XYE | 0 | WIP | WIP | WIP | 5 | 6 | 7 | 8 | 25 | 26 | 27 | 28 |
| | 0 | 0 | 0 | 0 | 100 | 100 | 100 | 100 | 100 | 100 | 100 | 100 |
| PRODUCT B FOR CUSTOMER FAMILY XYE | 0 | WIP | WIP | WIP | 9 | 10 | 11 | 12 | 29 | 30 | 31 | 32 |
| | 0 | 0 | 0 | 0 | 100 | 100 | 100 | 100 | 100 | 100 | 100 | 100 |
| AVAILABLE CAPACITY OF KNOWN MACHINES FOR PRODUCT A | 0 | WIP | WIP | 1 | 13 | 14 | 15 | 16 | 33 | 34 | 35 | 36 |
| | 0 | 0 | 0 | 100 | 100 | 100 | 100 | 100 | 100 | 100 | 100 | 100 |
| AVAILABLE CAPACITY OF KNOWN MACHINES FOR PRODUCT B | 0 | WIP | WIP | 2 | 17 | 18 | 19 | 20 | 37 | 38 | 39 | 40 |
| | 0 | 0 | 0 | 100 | 100 | 100 | 100 | 100 | 100 | 100 | 100 | 100 |
| REMAINING CAPACITY | 0 | WIP | 3 | 4 | 21 | 22 | 23 | 24 | 41 | 42 | 43 | 44 |
| | 0 | 0 | 100 | 100 | 100 | 100 | 100 | 100 | 100 | 100 | 100 | 100 |

Columns spanned by: N, N+1, N+2 (182)

| | 10/5 | 10/15 | 10/20 | 10/25 | 11/2 | 11/7 | 11/21 | 11/27 | 12/8 | 12/16 | 12/22 | 12/28 |
|---|---|---|---|---|---|---|---|---|---|---|---|---|
| PRODUCT A FOR CUSTOMER FAMILY XYE | 0 | WIP | WIP | WIP | 2 | 1 | 15 | 16 | 25 | 26 | 27 | 28 |
| | 0 | 0 | 0 | 0 | 100 | 100 | 100 | 100 | 100 | 100 | 100 | 100 |
| PRODUCT B FOR CUSTOMER FAMILY XYE | 0 | WIP | WIP | WIP | 4 | 3 | 17 | 18 | 29 | 30 | 31 | 32 |
| | 0 | 0 | 0 | 0 | 100 | 100 | 100 | 100 | 100 | 100 | 100 | 100 |
| AVAILABLE CAPACITY OF KNOWN MACHINES FOR PRODUCT A | 0 | WIP | WIP | 11 | 6 | 5 | 19 | 20 | 33 | 34 | 35 | 36 |
| | 0 | 0 | 0 | 100 | 100 | 100 | 100 | 100 | 100 | 100 | 100 | 100 |
| AVAILABLE CAPACITY OF KNOWN MACHINES FOR PRODUCT B | 0 | WIP | WIP | 12 | 8 | 7 | 21 | 22 | 37 | 38 | 39 | 40 |
| | 0 | 0 | 0 | 100 | 100 | 100 | 100 | 100 | 100 | 100 | 100 | 100 |
| REMAINING CAPACITY | 0 | WIP | 14 | 13 | 10 | 9 | 23 | 24 | 41 | 42 | 43 | 44 |
| | 0 | 0 | 100 | 100 | 100 | 100 | 100 | 100 | 100 | 100 | 100 | 100 |

Columns spanned by: X−1, X, X+1 (186)

*Figure 9*

AUTOMATED SUPPLY MANAGEMENT METHOD FOR DYNAMICALLY FULFILLING A CUSTOMER REQUESTED ORDER

FIELD OF THE INVENTION

The present invention relates to an automated supply management system for dynamically fulfilling a customer requested order and a method of use of an automated supply chain management system to automatically fulfill a customer order on-time.

BACKGROUND

In an automated manufacturing facility, it is important to dynamically fulfill a customer's product order within a customer requested due date. This need increases in importance in manufacturing facilities produce large volumes of advanced technology products such as a wafer or semiconductor manufacturing facility. In such a volatile business as wafer fabrication facility it is important to fulfill a customer order as close to a customer's requested due date as possible to avoid customer dissatisfaction in an ever increasing competitive market.

Typically, existing order promising systems within a wafer fabrication facility do not have the capability to accurately fulfill a customer's order on a customer requested date or within a time period that a customer requests. Instead, forecasts are generated to predict future order demands. However, the forecasts are not based on real-time events relating to facility operations, but instead are based on past practices, data and experiences of facility operations and facility personnel. Existing forecasting systems do not provide a dynamic feedback system to determine allocated capacity and constraints within a manufacturing facility. Thus, using an existing system a fabrication facility's processing capacity cannot be fully utilized in an efficient manner.

Typically, existing systems do not accommodate processing capacity constraints within a fabrication facility. Thus when a particular customer's order falls within a plurality of variable technology groups, the order may violate processing capacity restraints within the fabrication facility and adversely impact orders requests by different customers. Thus, the existing forecast systems do not accurately reflect a wafer fabrication facility's actual capacity constraints in situation where a customer places an order different than a forecasted order, or where a customer requests a variable product mix order.

It is desirable to provide an automated supply chain management system and a method of use of an automated supply chain management system to automatically fulfill a customer order on-time within a customer requested due date.

SUMMARY OF THE INVENTION

The present invention provides an automated supply chain management system and a method of use of an automated supply chain management system to automatically fulfill a customer order on-time is provided. The method uses an allocation search sequence method to fulfill customer orders in accordance with a customer's requested order due date. The system and method is used to achieve an optimal target date for fulfilling a customer's order. A customer's order is reserved in accordance with the order fulfillment system to reserve a customer order correlated processing capacity and reserves forecasted processing of the order according to a customer family to protect an order commitment to a customer.

The automated supply chain management system performs a real time capacity profile check, wherein the capacity profile check considers processing capacity when determining a date to fulfill a customer's order, and thus, improves the quality of an order commitment process. The capacity profile check ensures that a manufacturing system's capacity constraints are not violated when a customer's order varies from an originally forecasted order to eliminate the impact to overall order delivery. The system of the present invention further fully utilizes a remaining capacity of the system to further improve service to a customer, wherein a remaining capacity of the system is a difference between a forecasted order and an actual customer order.

More particularly, the present invention provides an automated supply management system for dynamically fulfilling a customer requested order having:

a) an order fulfillment system for fulfilling a plurality of customer requests in accordance with a plurality of processing capacity restraints defined for a plurality of pieces of manufacturing equipment disposed within a manufacturing facility;

b) an allocation planning system in operative communication with the order fulfillment system for receiving a plurality of capacity modeling data from the order fulfillment system, the allocation planning system further operates to communicate a plurality of capacity allocation search demand data to the order fulfillment system;

c) an order management system for communicating a plurality of consumption data and for further communicating a customer requested due date to the order fulfillment system, wherein the order management system requests the customer requested due date and receives a calendar date of production available to promise from the order fulfillment system in accordance with the customer requested due date; and d) a manufacturing planning system, the manufacturing planning system in operative communication with the order fulfillment system for receiving an order fulfillment matrix from the order fulfillment system.

The order management system further has:

a) a capacity modeling portion for generating a plurality of capacity modeling data associated with each of the plurality of pieces of manufacturing equipment disposed within the manufacturing facility;

b) an allocation management portion in operative communication with the capacity modeling portion for allocating resources for each of the plurality of pieces of manufacturing equipment disposed within the manufacturing facility;

c) an available to promise portion in operative communication with the order management system for generating a master production schedule forecast matrix, wherein the master production schedule forecast matrix is created by receiving a plurality of consumption data from the order management system to fulfill a customer order by the customer requested due date; and d) an output planning portion for using the master production schedule forecast matrix to create an order fulfillment matrix, the order fulfillment matrix provides a real-time dynamic forecast of customer ordered products associated with actual customer order requests.

Additionally, a method of use of an automated supply chain management system to automatically fulfill a customer order on-time is provided herewithin. The method the having the steps of:

a) defining a quantity M needed to fulfill a customer order;

b) defining a customer requested due date;

c) providing an order fulfillment matrix having a plurality of allocated capacity cells, each of the plurality of allocated capacity cells having an associated allocated capacity quantity T, wherein T equals or exceeds zero, and wherein each of the plurality of allocated capacity cells has an associated calendar date of production;

d) searching each of the plurality of allocated capacity cells having an allocated capacity quantity T exceeding zero in accordance with an allocation search sequence, the allocation search sequence selected from the group of as soon as possible, customer request date, and customer request date having a shipping window;

e) summing each allocated capacity quantity T associated with the searched plurality of allocated capacity cells until a summation of each allocated capacity quantity T associated with the searched plurality of allocated capacity cells equals or exceeds M; and f) returning a calendar date of production associated with a last searched one of the plurality of allocated capacity cells having an allocated capacity quantity T greater than zero to an order management system as an available to promise date to fulfill a customer order when the summation of each allocated capacity quantity T associated with the searched plurality of allocated capacity cells equals or exceeds M.

BRIEF DESCRIPTION OF THE DRAWINGS

These and other objects, features and advantages of the present invention will become apparent from the following detailed description and the appended drawings in which:

FIG. 1 is a block diagram overview of an automated supply chain management system used to dynamically fulfill a plurality of customer orders.

FIG. 2 is a graphical illustration of a master production schedule forecast matrix in accordance with the present invention.

FIG. 3 is a graphical illustration of an order fulfillment matrix in accordance with the present invention.

FIG. 4 is a flowchart showing a method of use of an automated supply chain management system to automatically fulfill a customer order on-time in accordance with the present invention.

FIG. 7 is a graphical illustration of one embodiment of an order fulfillment matrix being searched in accordance with an ASAP allocation search sequence.

FIG. 9 is a graphical illustration of one embodiment of an order fulfillment matrix being searched in accordance with a CRD allocation search sequence.

DETAILED DESCRIPTION OF THE PREFERRED EMBODIMENTS

Figure 5:
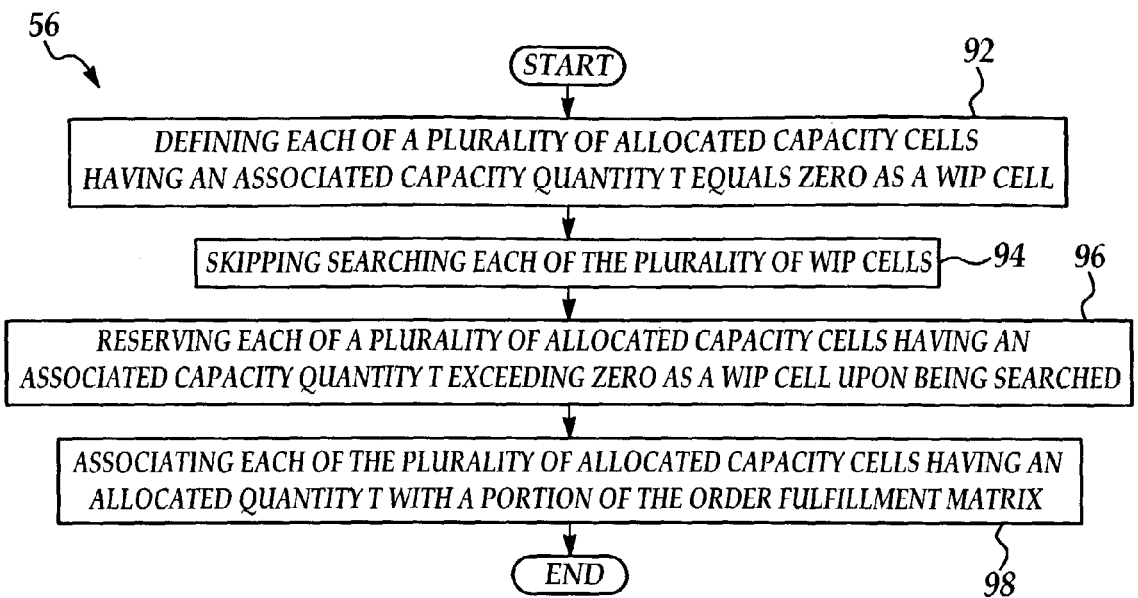
FIG. 5 is a flowchart defining additional steps of the method shown in FIG. 4.

The present invention provides an automated supply chain management system and an allocation search sequence method to fulfill customer orders in accordance with a customer's requested order due date. The system and method is used to achieve an optimal target date for fulfilling a customer's order. A customer's order is reserved in accordance with the order fulfillment system to reserve a customer order correlated processing capacity and reserves forecasted processing of the order according to a customer family to protect an order commitment to a customer. When available processing capacity is not allocated for a customer family, the system of the present invention maximizes the available processing capacity to better fulfill a customer's request. The order fulfillment system uses capacity allocated support demand (CASD) and available capacity of known machines to generate a correlated date available to promise a customer.

The automated supply chain management system performs a real time capacity profile check, wherein the capacity profile check considers processing capacity when determining a date to fulfill a customer's order, and thus, improves the quality of an order commitment process. The capacity profile check ensures that a manufacturing system's capacity constraints are not violated when a customer's order varies from an originally forecasted order to eliminate the impact to overall order delivery. The system of the present invention further fully utilizes a remaining capacity of the system to further improve service to a customer, wherein a remaining capacity of the system is a difference between a forecasted order and an actual customer order.

Referring now to the drawings, FIG. 1 shows an overview of an automated supply management system in accordance with the present invention. The automated supply management system 10 for dynamically fulfilling a customer requested order having an order fulfillment system 12, an allocation planning system 14 in operative communication with the order fulfillment system, an order management system 20, and a manufacturing planning system 28.

The allocation planning system 14 is in operative communication with the order fulfillment system 12 for receiving a plurality of capacity modeling data from the order fulfillment system 12, the allocation planning system 14 further operates to communicate a plurality of capacity allocation support demand ("CASD") data 18 to the order fulfillment system 12.

The order management system 20 communicates a plurality of consumption data 22 and further communicates a requested customer order due date 24 to the order fulfillment system 12, wherein the order management system 20 requests the customer requested due date 24 and then receives a calendar date of production available to promise 26 from the order fulfillment system 12 in accordance with the requested customer order due date 24.

The manufacturing planning system 28 is in operative communication with the order fulfillment system 12 for receiving an order fulfillment matrix 50 (as shown in more detail in FIG. 3) from the order fulfillment system 12.

The order fulfillment system 12 fulfills a plurality of customer requests in accordance with a plurality of processing capacity restraints defined for one or a plurality of pieces of manufacturing equipment disposed within an automated manufacturing facility. Preferably, the automated facility is a wafer fabrication or a semiconductor manufacturing facility. However, the above is not intended as limiting, and the present system could be used in any automated facility having at least one piece of automated equipment or a plurality of automated equipment.

The order fulfillment system 12 further has a capacity modeling portion 32, an allocation management portion 40, an available to promise portion 42, and an output planning portion 48.

The capacity modeling portion 32 of the order fulfillment system 12 generates a plurality of capacity modeling data 34 associated with each of the plurality of pieces of manufacturing equipment 36 (not shown) disposed within the manufacturing facility 38 (not shown).

The allocation management portion 40 is in operative communication with the capacity modeling portion 32 for allocating resources for each of the plurality of pieces of manufacturing equipment 36 disposed within the manufacturing facility 38.

The available to promise ("ATP") portion 42 is in operative communication with the order management system for generating a master production schedule forecast matrix 44 (shown in detail in FIG. 2), wherein the master production schedule forecast matrix 44 is created by receiving a plurality of consumption data 46 from the order management system 20 to fulfill a customer order by the requested customer order due date 24.

The master production schedule forecast matrix 44 is shown in FIG. 2, wherein the master production schedule forecast matrix 44 has a plurality of allocated capacity forecast cells 162. Each of the plurality of allocated capacity forecast cells 162 has an associated forecast quantity T, wherein T equals or exceeds zero.

As shown in FIG. 2, each of the plurality of allocated capacity forecast cells 162 having an associated forecast quantity T equal to 100 units of allocated capacity quantity. The quantity T of 100 is used for illustration purposes only and may be any unit amount equaling or exceeding zero.

Each of the plurality of allocated capacity forecast cells 162 further has an associated calendar date of production 164, each calendar date of production 164 associated with a month, N, wherein N is an integer greater than zero. As shown in FIG. 2, N is the month of October having associated calendar dates of production 10/5, 10/15, 10/20, and 10/25 respectively. Similarly, N+1 is the month of November having associated calendar dates of production 11/2, 11/7, 11/21, and 11/27. The next month, N+2 or December has a plurality of associated calendar dates of production 12/8, 12/16, 12/22, and 12/28 respectively.

Each of the plurality of allocated capacity forecast cells 162 having an associated forecast quantity T further has an associated portion of the master production schedule forecast 166, 168. The associated portion of the master production schedule matrix 166, 168 is selected from a customer family portion 166, and an available capacity of known machines portion 168.

The customer family portion 166 has an associated one or a plurality of rows 170, 172 associated with a technology product A and with technology product B respectively, wherein the customer family portion is associated with a customer XYZ that has requested one or a plurality of products associated with at least one technology to be produced for the customer family.

The available capacity of known machines portion 168 is associated with all available manufacturing machines capable of manufacturing the at least one or a plurality of products associated with the customer family XYZ. As shown, the available capacity of known machines portion 168 has an associated one or a plurality of rows 174, 176 associated with a product A and with product B, respectively.

The output planning portion 48 for using the master production schedule forecast matrix to create an order fulfillment matrix 50, wherein the order fulfillment matrix 50 provides a real-time dynamic forecast of customer ordered products associated with actual customer order requests.

The order fulfillment matrix 50 is a customer driven table reflecting the demands of forecasted customer orders as shown in FIG. 3, wherein the order fulfillment matrix 50 has a plurality of allocated capacity cells 54. Each of the plurality of allocated capacity cells 54 has an associated allocated capacity quantity T, wherein T equals or exceeds zero. When the associated capacity quantity T equals zero for an associated one of the plurality of allocated capacity cells 54, the associated one of the plurality of allocated capacity cells 54 becomes a WIP cell 74, wherein the WIP cell 74 is not available for searching in accordance with a selected allocation search sequence.

As shown in FIG. 3, each of the plurality of allocated capacity cells 54 having an associated allocated capacity quantity T greater than zero, wherein T equals 100 units of allocated capacity quantity. The quantity T of 100 is used for illustration purposes only and may be any unit amount equaling or exceeding zero. Additionally, each of the plurality of allocated capacity cells 54 having an associated allocated capacity quantity T equaling zero are reserved as WIP cells 74, wherein T equals 0 units of available allocated capacity quantity for each WIP cell.

Each of the plurality of allocated capacity cells 54 further has an associated calendar date of production 56, each calendar date of production associated with a month, N, wherein N is an integer greater than zero. As shown in FIG. 3 N is the month of October having associated calendar dates of production 10/5, 10/15, 10/20, and 10/25 respectively. Similarly, N+1 is the month of November having associated calendar dates of production 11/2, 11/7, 11/21, and 11/27. The next month, N+1 or December has a plurality of associated calendar dates of production 56, 12/8, 12/16, 12/22, and 12/28 respectively.

Each of the plurality of allocated capacity cells 54 having an allocated quantity T further has an associated portion of the order fulfillment matrix 58, 60, 62. The associated portion of the order fulfillment matrix 58, 60, 62 is selected from the group of a customer family portion 58, an available capacity of known machines portion 60, and a remaining capacity portion 62.

The customer family portion 58 has an associated one or a plurality of rows 64, 66 associated with a technology product A and with technology product B respectively, wherein the customer family portion is associated with a customer XYZ that has requested one or a plurality of products associated with at least one technology to be produced for the customer family.

The available capacity of known machines portion 60 is associated with all available manufacturing machines capable of manufacturing the at least one or a plurality of products associated with the customer family XYZ. As shown, the available capacity of known machines portion 60 has an associated one or a plurality of rows 68, 70 associated with a product A and with product B, respectively.

Additionally, the remaining capacity portion 62 has an associated row 72, wherein the remaining capacity portion equals a difference in processing capacity determined between a forecasted order and an actual customer order.

As shown in FIG. 1, in operation, the capacity modeling portion 32 communicates the plurality of capacity modeling data 34 to the allocation planning system 14 and to the output planning portion 48. Additionally, the ATP portion 42 cooperates with the order management system 20 to communicate the plurality of consumption data 22 to the allocation management portion 40. The ATP portion 42 further cooperates with the order management system 20 to communicate the master production schedule forecast matrix 44 to the output planning portion 48.

The allocation management portion 40 uses data selected from the group of the plurality of consumption data 22 communicated from the ATP portion 42 and the plurality of CASD data 18 communicated from the allocation planning system 14 to allocate resources for each of the plurality of pieces of manufacturing equipment 36 disposed within the manufacturing facility 38. The allocation management portion 40 further communicates a plurality of updated CASD data 52 to the output planning portion 48, wherein the plurality of updated CASD data 52 is created by the output planning portion 48 using the plurality of consumption data 22 and the plurality of CASD data 18. The output planning portion 48 further uses data selected from the group of the master production schedule forecast matrix 44 communicated from the ATP portion 42, the plurality of updated CASD data 52 communicated from the allocation management portion 40, and the plurality of capacity modeling data 16 communicated from the capacity modeling portion 32 to create the order fulfillment matrix 50. The output planning portion 48 communicates the order fulfillment matrix 50 to the ATP portion 42 and to the manufacturing planning system 28.

As shown in FIG. 4, a method 56 of using an automated supply chain management system to automatically fulfill a customer order on-time is provided herewithin. The method 56 has the steps of:
- a) defining a quantity M needed to fulfill a customer order (step 80);
- b) defining a customer requested due date (step 82);
- c) providing an order fulfillment matrix having a plurality of allocated capacity cells, each of the plurality of allocated capacity cells having an associated allocated capacity quantity T, wherein T equals or exceeds zero, and wherein each of the plurality of allocated capacity cells has an associated calendar date of production (step 84);
- d) searching each of the plurality of allocated capacity cells having an allocated capacity quantity T exceeding zero in accordance with an allocation search sequence, the allocation search sequence selected from the group of ASAP, CRD, and CRD having a shipping window (step 86);
- e) summing each allocated capacity quantity T associated with the searched plurality of allocated capacity cells until a summation of each allocated capacity quantity T associated with the searched plurality of allocated capacity cells equals or exceeds M, wherein $\Sigma T > 0$, until $\Sigma T >= M$ (step 88); and
- f) returning a calendar date of production associated with a last searched one of the plurality of allocated capacity cells having an allocated capacity quantity T greater than zero to an order management system as an available to promise date to fulfill a customer order when the summation of each allocated capacity quantity T associated with the searched plurality of allocated capacity cells equals or exceeds M (step 90).

As shown in an embodiment depicted in FIG. 5, the method 76 preferably has the optional steps of:
- defining each of a plurality of allocated capacity cells having an associated capacity quantity T equaling zero as a WIP cell (step 92), wherein each WIP cell is not available for searching in accordance with a selected allocation search sequence;
- skipping searching each of the plurality of WIP cells in accordance with an allocation search sequence (step 94);
- reserving each of a plurality of allocated capacity cells having an associated capacity quantity T exceeding zero as a WIP cell upon being searched in accordance with a selected allocation search sequence (step 96);
- associating each of the plurality of allocated capacity cells having an allocated quantity T with a portion of the order fulfillment matrix (step 98), the portion of the matrix selected from the group of a customer family portion, an available capacity of known machines portion, and a remaining capacity portion.

Figure 6:
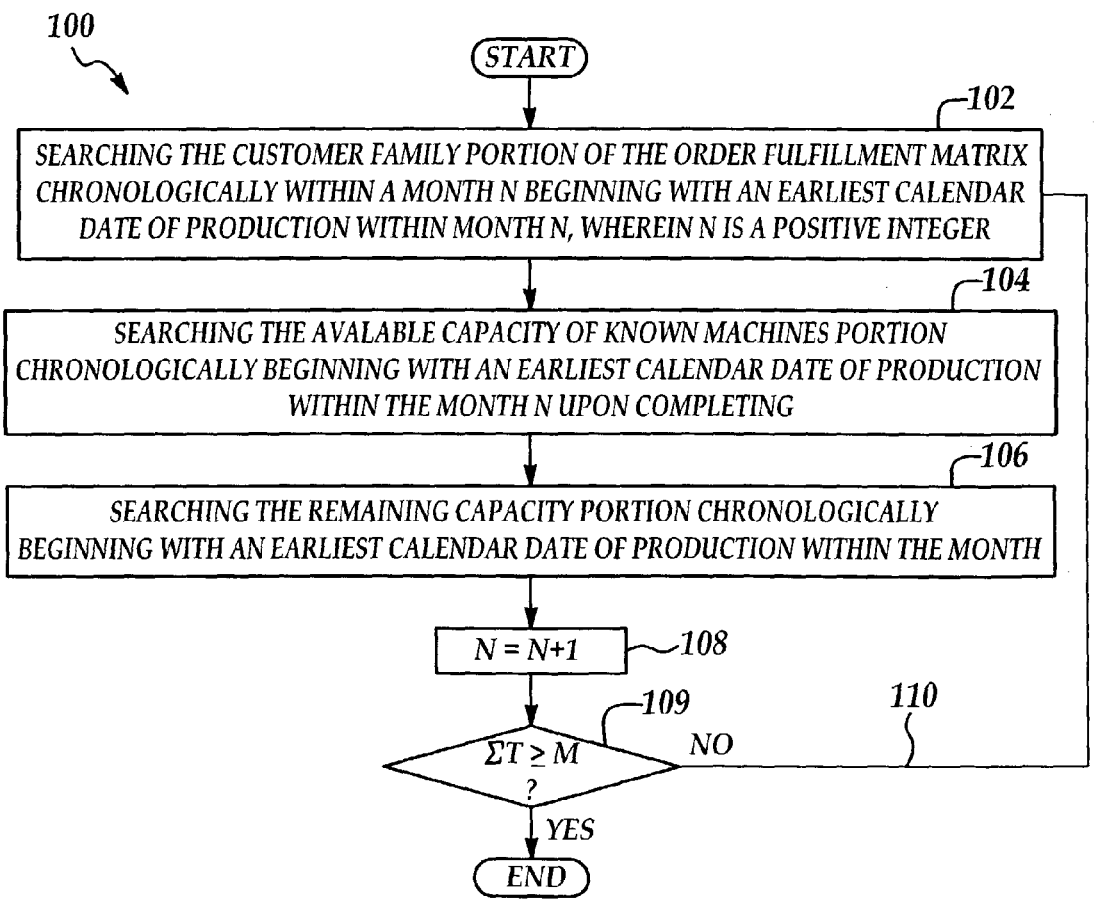
FIG. 6 is a flowchart showing a method of performing an ASAP allocation search sequence.

In accordance with one embodiment of the present invention a method of searching the order fulfillment matrix to fulfill a customer order as soon as possible ("ASAP") has the step of performing an ASAP allocation search sequence to search the order fulfillment matrix (step 100), as shown in a flowchart of FIG. 6 and in a graphical representation of the search sequence performed within an order fulfillment matrix in FIG. 7.

The ASAP allocation search sequence having the substeps of:
- searching the customer family portion of the order fulfillment matrix chronologically within a month N beginning with an earliest calendar date of production within month N, wherein N is a positive integer (step 102);
- searching the available capacity of known machines portion chronologically beginning with an earliest calendar date of production within the month N upon completing step 102 (step 104);
- searching the remaining capacity portion chronologically beginning with an earliest calendar date of production within the month upon completing step 104 (step 106);
- incrementing N by 1, wherein N=N+1 (step 108);
- determining whether the summation of each allocated capacity quantity T associated with the searched plurality of allocated capacity cells equals or exceeds M upon completing step 108 (step 109); and
- repeating steps 102, 104, 106, 108, and 109 until the summation of each allocated capacity quantity T associated with the searched plurality of allocated capacity cells equals or exceeds M (step 110).

More particularly, as shown in FIG. 7, an order fulfillment matrix 180 is searched by performing the step of performing the ASAP allocation search sequence to search the order fulfillment matrix 180 (step 100). The order fulfillment matrix 180 is similar to the order fulfillment matrix 50, however, the order fulfillment matrix 180 of the present embodiment additionally has a plurality of sequential numbers 182 associated with each of a plurality of allocation capacity cells, wherein the plurality of sequential numbers represent the order of searching that is performed by the ASAP allocation search sequence.

Figure 8:
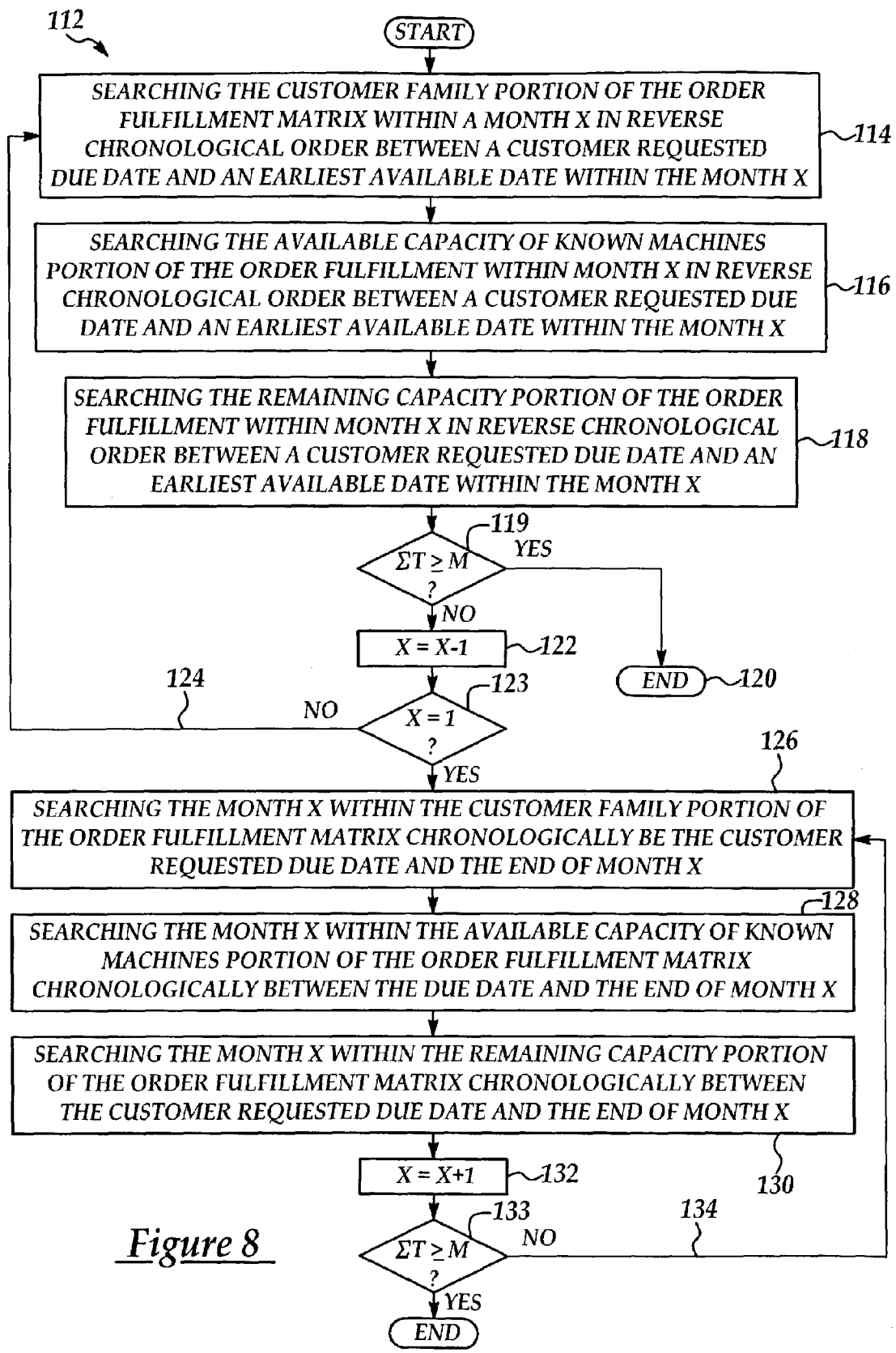
FIG. 8 is a flowchart showing a method of performing a CRD allocation search sequence.
Figure 10:
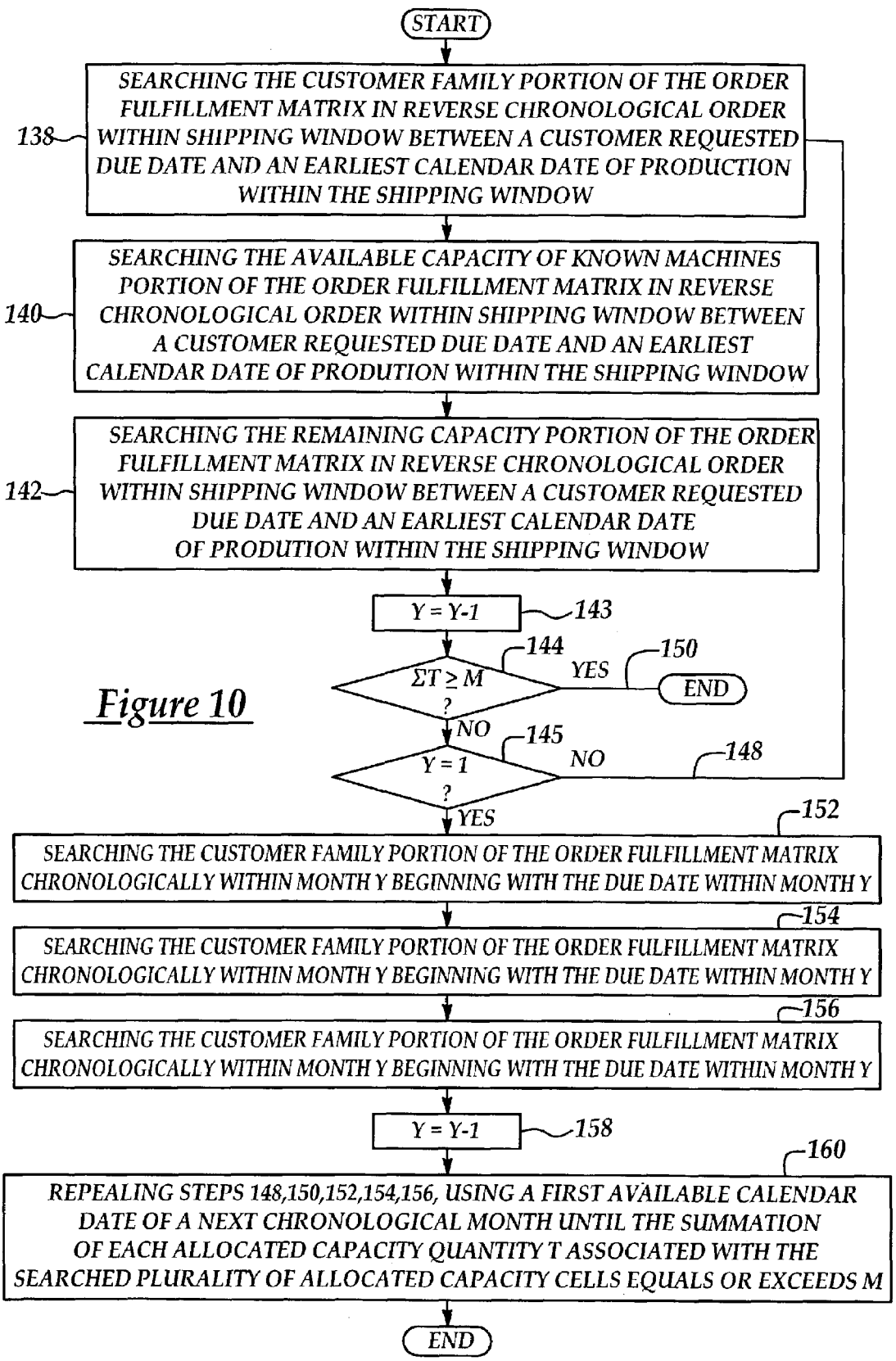
FIG. 10 is a flowchart showing a method of performing an CRD allocation search sequence having a shipping window.

As shown in FIG. 8, in accordance with one another embodiment of the present invention, a method of searching the order fulfillment matrix to fulfill a customer order near a customer requested due date has the step of performing a customer request date ("CRD") allocation search sequence to search the order fulfillment matrix (step 112).

The CRD allocation search sequence having the substeps of:
- searching the customer family portion of the order fulfillment matrix within a month X in reverse chronological order between a customer requested due date and an earliest available date within the month X, wherein X is an integer equal to or greater than 1 (step 114);
- searching the available capacity of known machines portion of the order fulfillment within month X in reverse chronological order between a customer requested due date and an earliest available date within the month X upon performing step 114 (step 116);

searching the remaining capacity portion of the order fulfillment within month X in reverse chronological order between a customer requested due date and an earliest available date within the month X upon performing step 116 (step 118);

determining whether the summation of each allocated capacity quantity T associated with the searched plurality of allocated capacity cells equals or exceeds M upon completing step 118 (step 119);

stopping the search sequence the summation of each allocated capacity quantity T associated with the searched plurality of allocated capacity cells equals or exceeds M (step 120);

decrementing X by 1 if the summation of each allocated capacity quantity T associated with the searched plurality of allocated capacity cells does not equal or exceed M, wherein X=X−1 (step 122);

determining whether X=1 upon completing step 122 (step 123)

repeating steps 114, 116, 118, 119, 120, 122, 123 until X equals 1 if the summation of each allocated capacity quantity T associated with the searched plurality of allocated capacity cells does not equal or exceed M (step 124);

searching the month X within the customer family portion of the order fulfillment matrix chronologically between the customer requested due date and the end of month X upon completing step 124 (step 126);

searching the month X within the available capacity of known machines portion of the order fulfillment matrix chronologically between the due date and the end of month X upon completing step 126 (step 128);

searching the month X within the remaining capacity portion of the order fulfillment matrix chronologically between the customer requested due date and the end of month X upon completing step 128 (step 130);

incrementing X by 1, wherein X=X+1 (step 132);

determining whether the summation of each allocated capacity quantity T associated with the searched plurality of allocated capacity cells equals or exceeds M upon completing step 132 (step 133); and repeating steps 124, 126, 128, 130, 132, 133 until the summation of each allocated capacity quantity T associated with the searched plurality of allocated capacity cells equals or exceeds M (step 134).

More particularly, as shown in FIG. 9, an order fulfillment matrix 184 is searched by performing the step of performing the CRD allocation search sequence to search the order fulfillment matrix 184 (step 112). The order fulfillment matrix 184 is similar to the order fulfillment matrix 50 as shown in FIG. 3, however, the order fulfillment matrix 184 of the present embodiment additionally has a plurality of sequential numbers 186 associated with each of a plurality of allocation capacity cells, wherein the plurality of sequential numbers represent the order of searching that is performed by the CRD allocation search sequence. The due date for month X is shown as 11/7, however any calendar date of production could be given as the customer due date.

In accordance with one another embodiment of the present invention, a method of searching the order fulfillment matrix to fulfill a customer order near a customer requested due date has the step of performing a customer request date ("CRD") allocation search sequence having a shipping window to search the order fulfillment matrix (step 136).

The CRD allocation search sequence having a shipping window having the substeps of:

searching the customer family portion of the order fulfillment matrix in reverse chronological order within shipping window between a customer requested due date and an earliest calendar date of production within the shipping window, wherein the earliest specified calendar date within the shipping window is disposed within month Y (138);

searching the available capacity of known machines portion of the order fulfillment matrix in reverse chronological order within shipping window between a customer requested due date and an earliest calendar date of production within the shipping window upon completing step 138 (step 140);

searching the remaining capacity portion of the order fulfillment matrix in reverse chronological order within shipping window between a customer requested due date and an earliest calendar date of production within the shipping window upon completing step 140 (step 142);

decrementing Y by 1, Y being an integer equal to or greater than 1, wherein Y=Y−1 (step 143);

determining whether the summation of each allocated capacity quantity T associated with the searched plurality of allocated capacity cells equals or exceeds M upon completing step 143 (step 144);

determining whether Y=1 if the summation of each allocated capacity quantity T associated with the searched plurality of allocated capacity cells does not equal or exceed M upon completing step 144 (step 146);

stopping the search sequence if the summation of each allocated capacity quantity T associated with the searched plurality of allocated capacity cells equals or exceeds M (step 148);

repeating steps 138, 140, 142, 143, 144, 146 using a last available calendar date of a previous chronological month, Y−1, until the summation of each allocated capacity quantity T associated with the searched plurality of allocated capacity cells equals or exceeds M (step 150);

searching the customer family portion of the order fulfillment matrix chronologically within month Y beginning with the due date within month Y if the summation of each allocated capacity quantity T associated with the searched plurality of allocated capacity cells does not equal or exceed M upon completing step 150 (step 152);

searching the available capacity of known machines portion chronologically within the month Y beginning with the due date within month Y if the summation of each allocated capacity quantity T associated with the searched plurality of allocated capacity cells does not equal or exceed M upon completing step 152 (step 154);

searching the remaining capacity portion chronologically between the due date within the month Y and a last available date of the month Y upon completing step 154 (step 156);

incrementing Y by 1, wherein Y=Y+1 (step 158); and repeating steps 148, 150, 152, 154, 156 using a first available calendar date of a next chronological month until the summation of each allocated capacity quantity T associated with the searched plurality of allocated capacity cells equals or exceeds M (step 160).

Figure 11:
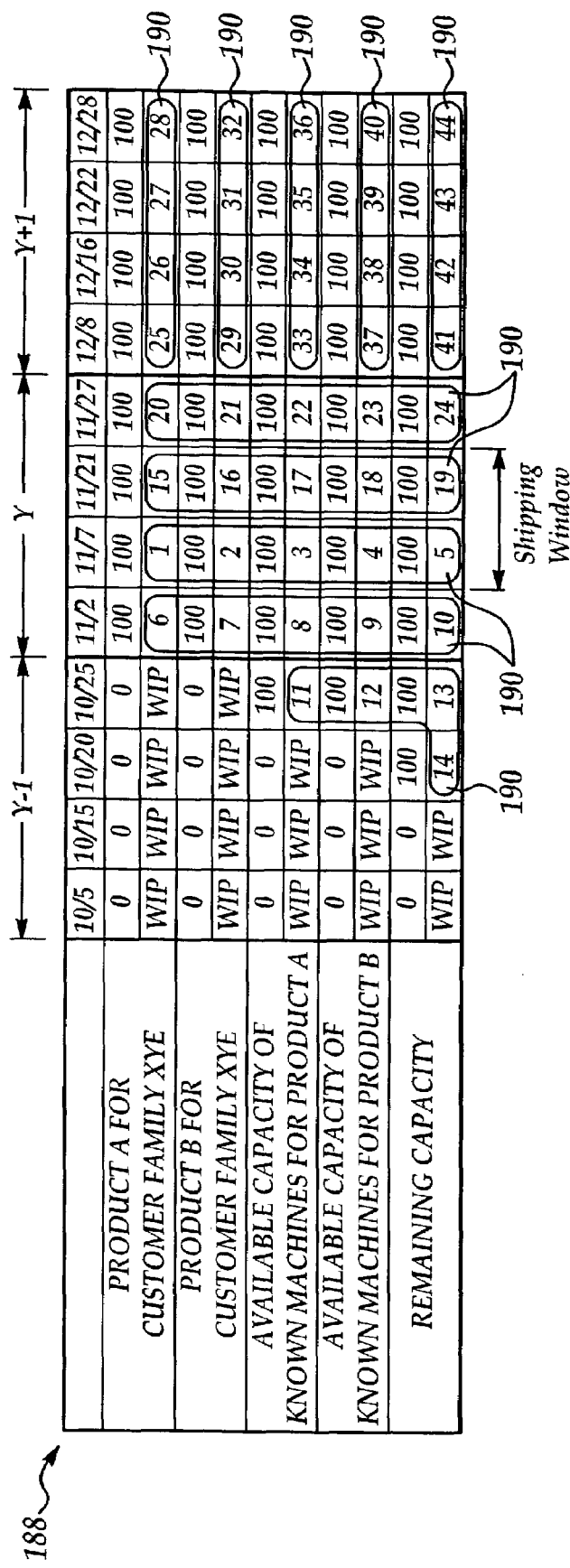
FIG. 11 is a graphical illustration of one embodiment of an order fulfillment matrix being searched in accordance with a CRD allocation search sequence having a shipping window.

More particularly, as shown in FIG. 11, an order fulfillment matrix 188 is searched by performing the step of performing the CRD allocation search sequence having a shipping window to search the order fulfillment matrix 188 (step 136). The order fulfillment matrix 188 is similar to the order fulfillment matrix 50 as shown in FIG. 3, however, the order fulfillment matrix 188 of the present embodiment additionally has a plurality of sequential numbers 190 associated with each of a plurality of allocation capacity cells, wherein the plurality of sequential numbers 190 represent the order of searching that is performed by the CRD allocation search sequence having a shipping window. The shipping window ranges between a calendar date of production prior to the customer due date and a calendar date of production after the customer due date. The due date for month Y is shown as 11/7 in FIG. 11, however any calendar date of production could be given as the customer due date. Also as shown in FIG. 11, the shipping window ranges between 11/3 and 11/21.

From the foregoing, it should be appreciated that a system and method are provided for an automated supply chain system and an order fulfillment method used to accurately fulfill customer orders.

While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A method of using an automated supply chain management system to automatically fulfill a customer order on-time, the method comprising the steps of:
 a) defining a quantity N needed to fulfill a customer order;
 b) defining a customer requested due date;
 c) providing an order fulfillment matrix having a plurality of allocated capacity cells, each of the plurality of allocated capacity cells having an associated allocated capacity quantity T, wherein T equals or exceeds zero, and wherein each of the plurality of allocated capacity cells has an associated calendar date of production;
 d) searching each of the plurality of allocated capacity cells having an allocated capacity quantity T exceeding zero in accordance with an allocation search sequence, the allocation search sequence selected from the group of as soon as possible, customer request date, and customer request date having a shipping window;
 e) summing each allocated capacity quantity T associated with the searched plurality of allocated capacity cells until a summation of each allocated capacity quantity T associated with the searched plurality of allocated capacity cells equals or exceeds M; and
 f) returning a calendar date of production associated with a last searched one of the plurality of allocated capacity cells having an allocated capacity quantity T greater than zero to an order management system as an available to promise date to fulfill a customer order when the summation of each allocated capacity quantity T associated with the searched plurality of allocated capacity cells equals or exceeds N;
 g) defining each of a plurality of allocated capacity cells having an associated capacity quantity T equaling zero as a work in process cell, wherein each work in process cell is not available for searching in accordance with a selected allocation search sequence;
 h) skipping searching each of the plurality of work in process cells in accordance with an allocation search sequence;
 i) reserving each of a plurality of allocated capacity cells having an associated capacity quantity T exceeding zero as a work in process cell upon being searched in accordance with a selected allocation search sequence;
 j) associating each of the plurality of allocated capacity cells having an allocated quantity T with a portion of the order fulfillment matrix, the portion of the matrix selected from the group of a customer family portion, an available capacity of known machines portion, and a remaining capacity portion;
 k) performing a customer request date allocation search sequence to search the order fulfillment matrix, the customer request date allocation search sequence having the substeps of:
  i) searching the customer family portion of the order fulfillment matrix within a month X in reverse chronological order between a customer requested due date and an earliest available date within the month X, wherein X is an integer equal to or greater than 1;
  ii) searching the available capacity of known machines portion of the order fulfillment within month K in reverse chronological order between a customer requested due date and an earliest available date within the month K upon performing step i);
  iii) searching the remaining capacity portion of the order fulfillment within month K in reverse chronological order between a customer requested due date and an earliest available date within the month K upon performing step ii;
  iv) determining whether the summation of each allocated capacity quantity T associated with the searched plurality of allocated capacity cells equals or exceeds N upon completing step iii);
  v) stopping the search sequence if the summation of each allocated capacity quantity T associated with the searched plurality of allocated capacity cells equals or exceeds M;
  vi) decrementing X by 1 if the summation of each allocated capacity quantity T associated with the searched plurality of allocated capacity cells does not equal or exceed N, wherein X=X−1;
  vii) determining whether X=1 upon completing step vi;
  viii) repeating steps i-vi until X equals 1 if the summation of each allocated capacity quantity T associated with the searched plurality of allocated capacity cells does not equal or exceed N;
  ix) searching the month X within the customer family portion of the order fulfillment matrix chronologically between the customer requested due date and the end of month X upon completing step vii);
  x) searching the month X within the available capacity of known machines portion of the order fulfillment matrix chronologically between the due date and the end of month X upon completing step viii;
  xi) searching the month X within the remaining capacity portion of the order fulfillment matrix chronologically between the customer requested due date and the end of month X upon completing step ix;
  xii) incrementing X by 1, wherein X=X+1;
  xiii) determining whether the summation of each allocated capacity quantity T associated with the searched plurality of allocated capacity cells equals or exceeds M upon completing step xii; and xiiii) repeating steps ix-xiii until the summation of each allocated capacity quantity T associated with the searched plurality of allocated capacity cells equals or exceeds M.

2. A method of using an automated supply chain management system to automatically fulfill a customer order on-time, the method comprising the steps of:
a) defining a quantity M needed to fulfill a customer order;
b) defining a customer requested due date;
c) providing an order fulfillment matrix having a plurality of allocated capacity cells, each of the plurality of allocated capacity cells having an associated allocated capacity quantity T, wherein T equals or exceeds zero, and wherein each of the plurality of allocated capacity cells has an associated calendar date of production;
d) searching each of the plurality of allocated capacity cells having an allocated capacity quantity T exceeding zero in accordance with an allocation search sequence, the allocation search sequence selected from the group of as soon as possible, customer request date, and customer request date having a shipping window;
e) summing each allocated capacity quantity T associated with the searched plurality of allocated capacity cells until a summation of each allocated capacity quantity T associated with the searched plurality of allocated capacity cells equals or exceeds M; and
f) returning a calendar date of production associated with a last searched one of the plurality of allocated capacity cells having an allocated capacity quantity T greater than zero to an order management system as an available to promise date to fulfill a customer order when the summation of each allocated capacity quantity T associated with the searched plurality of allocated capacity cells equals or exceeds M;
g) defining each of a plurality of allocated capacity cells having an associated capacity quantity T equaling zero as a work in process cell, wherein each work in process cell is not available for searching in accordance with a selected allocation search sequence;
h) skipping searching each of the plurality of work in process cells in accordance with an allocation search sequence;
i) reserving each of a plurality of allocated capacity cells having an associated capacity quantity T exceeding zero as a work in process cell upon being searched in accordance with a selected allocation search sequence.
j) associating each of the plurality of allocated capacity cells having an allocated quantity T with a portion of the order fulfillment matrix, the portion of the matrix selected from the group of a customer family portion, an available capacity of known machines portion, and a remaining capacity portion; and
k) performing a customer request date allocation search sequence having a shipping window to search the order fulfillment matrix, the customer request date allocation search sequence having a shipping window the substeps of:
i) searching the customer family portion of the order fulfillment matrix in reverse chronological order within shipping window between a customer requested due date and an earliest calendar date of production within the shipping window, wherein the earliest specified calendar date within the shipping window is disposed within month Y;
ii) searching the available capacity of known machines portion of the order fulfillment matrix in reverse chronological order within shipping window between a customer requested due date and an earliest calendar date of production within the shipping window upon completing step i);
iii) searching the remaining capacity portion of the order fulfillment matrix in reverse chronological order within shipping window between a customer requested due date and an earliest calendar date of production within the shipping window upon completing step ii;
iv) decrementing Y by 1, Y being an integer equal to or greater than 1, wherein Y=Y−1;
v) determining whether the summation of each allocated capacity quantity T associated with the searched plurality of allocated capacity cells equals or exceeds M upon completing step iv;
vi) determining whether Y=1 if the summation of each allocated capacity quantity T associated with the searched plurality of allocated capacity cells does not equal or exceed M upon completing step v;
vii) stopping the search sequence if the summation of each allocated capacity quantity T associated with the searched plurality of allocated capacity cells equals or exceeds M;
viii) repeating steps iii-vi using a last available calendar date of a previous chronological month, Y−1, until the summation of each allocated capacity quantity T associated with the searched plurality of allocated capacity cells equals or exceeds M;
ix) searching the customer family portion of the order fulfillment matrix chronologically within month Y beginning with the due date within month Y if the summation of each allocated capacity quantity T associated with the searched plurality of allocated capacity cells does not equal or exceed 14 upon completing step viii;
x) searching the available capacity of known machines portion chronologically within the month Y beginning with the due date within month Y if the summation of each allocated capacity quantity T associated with the searched plurality of allocated capacity cells does not equal or exceed M upon completing step ix;
xi) searching the remaining capacity portion chronologically between the due date within the month Y and a last available date of the month Y upon completing step x;
xii) incrementing Y by 1, wherein Y=Y+1; and
xiii) repeating steps ix-xii using a first available calendar date of a next chronological month until the summation of each allocated capacity quantity T associated with the searched plurality of allocated capacity cells equals or exceeds N.

* * * * *